(12) United States Patent
Bryant-Rich et al.

(10) Patent No.: US 7,296,144 B2
(45) Date of Patent: Nov. 13, 2007

(54) METHOD OF TRACELESS PORTABLE APPLICATION EXECUTION

(75) Inventors: Donald Ray Bryant-Rich, Haifa (IL); Ittai Golde, Rishon Lezion (IL); Yaakov Ben Tsvi, Bat Yam (IL); Erez Baum, Rehovot (IL); Daniel Yerushalmi, Raanana (IL)

(73) Assignee: SanDisk IL Ltd., Kfar Saba (IL)

( * ) Notice: Subject to any disclaimer, the term of this patent is extended or adjusted under 35 U.S.C. 154(b) by 360 days.

(21) Appl. No.: 10/994,384

(22) Filed: Nov. 23, 2004

(65) Prior Publication Data

US 2005/0114643 A1 May 26, 2005

Related U.S. Application Data

(60) Provisional application No. 60/524,025, filed on Nov. 24, 2003.

(51) Int. Cl.
*G06F 1/24* (2006.01)
(52) U.S. Cl. .............................. 713/100; 713/1; 713/2; 709/220; 709/221; 717/173
(58) Field of Classification Search .................... None
See application file for complete search history.

(56) References Cited

U.S. PATENT DOCUMENTS

| | | | |
|---|---|---|---|
| 5,404,485 A | 4/1995 | Ban | |
| 5,845,090 A * | 12/1998 | Collins et al. | 709/221 |
| 5,848,296 A | 12/1998 | Suzuki | |
| 6,117,186 A | 9/2000 | Wydall et al. | |
| 6,122,734 A | 9/2000 | Jeon | |
| 6,148,354 A | 11/2000 | Ban et al. | |
| 6,182,286 B1 * | 1/2001 | Sigal et al. | 717/122 |
| 6,470,413 B1 | 10/2002 | Ogawa | |
| 6,567,334 B2 | 5/2003 | Yamagami et al. | |
| 6,601,139 B1 | 7/2003 | Suzuki | |
| 7,162,628 B2 * | 1/2007 | Gentil et al. | 713/100 |

* cited by examiner

*Primary Examiner*—A. Elamin
(74) *Attorney, Agent, or Firm*—Mark M. Friedman

(57) ABSTRACT

When a non-volatile memory device is reversibly operationally connected to a computer, the computer executes an application that is stored on the device. The execution causes changes to a non-volatile memory of the computer. After the execution terminates, all such changes are undone, either immediately if the termination was normal or upon rebooting the computer if the termination was abnormal. Before or during the execution, information related to the changes is recorded. The undoing of the changes is based on that information. Examples of such information recorded before the execution include a list of expected changes and a partial or full copy of the computer's non-volatile memory.

27 Claims, 7 Drawing Sheets

METHOD OF TRACELESS PORTABLE APPLICATION EXECUTION

This is a continuation-in-part of U.S. Provisional Patent Application No. 60/524,025, filed Nov. 24, 2003

FIELD AND BACKGROUND OF THE INVENTION

The present invention relates to a method of executing data processing applications and to a storage medium on which such applications are stored. More specifically, the present invention relates to a method of data processing in which the data and the data processing applications are stored on a medium separate from the apparatus that executes the applications, such that the execution of the applications does not leave behind any modifications to the data storage means of the apparatus.

Personal Computers are most commonly used by single individuals. The individual user of a Personal Computer may install applications, modify the configuration of the applications and store application data on the Personal Computer. Even when a Personal Computer is used by several users, the use of the computer is restricted to a specified list of users, the applications are installed on the Personal Computer and the configuration and data used by each application are stored separately for each user. A personal computer often also has a generally usable but very restricted access method such as a "guest" account.

A growing number of computers are available to multiple users without the users being specified for the computer. These computers may be provided with general applications, but the users generally are not able to modify the configuration of the applications or permanently store application data on the computers. Examples of such general availability computers include computers allocated to employees at need, computers in Internet Cafés, computers in computer kiosks and computers located in publicly accessible facilities such as libraries, college campuses and airports.

General availability computers are mainly useful with network based applications such as web browsers, search engines and browser based applications such as mail clients. The use of such applications often is limited by a lack of available local storage, a need to transfer portions of the programs over a network instead of from local storage and the inability of the users to control access to their application data.

General availability computers are commonly configured to provide only minimal functionality to their users. For example, the users of a general availability computer typically are not allowed to install applications, modify application configurations or permanently store application data on the computer.

It is known to store an application on a portable storage medium and to operationally connect the medium to a computer that executes the application, such that there is no need to install the application permanently in the computer. One representative patent that teaches such a method of data processing, and that is incorporated by reference for all purposes as if fully set forth herein, is U.S. Pat. No. 6,117,186, to Wydall et al. Wydall et al. teach an application, stored on a CD-ROM disk, that is executed simply by inserting the CD-ROM disk into the CD-ROM drive of any computer.

Another representative patent that teaches such a method of data processing, and that is incorporated by reference for all purposes as if fully set forth herein, is U.S. Pat. No. 6,601,139, to Suzuki. Suzuki teaches a data processing system that includes a computer whose installed software is restricted to an operating system, and a set of storage media on which are stored specific applications. When one of the storage media is inserted into a drive of the computer, the computer becomes a single-purpose machine dedicated to the application stored on that storage medium. For example, if the application is a word processing application, the computer becomes a word processor.

Other relevant U.S. patents, all of which also are incorporated by reference for all purposes as if fully set forth herein, include U.S. Pat. No. 5,848,296 to Suzuki, U.S. Pat. No. 6,122,734 to Jeon and U.S. Pat. No. 6,470,413 to Ogawa.

One deficiency in the prior art methods of data processing, in the context of general availability computers, is that the executed applications do not "clean up after themselves". After the execution of an application terminates, some of the data that the application wrote to the non-volatile memories (e.g., hard disk) of the host computer are still present in those memories. It is at least impolite for a user of a general availability computer not to clean up after him/herself. Furthermore, the data left behind can be retrieved by a sufficiently skilled subsequent user of the computer, and some of this data may be of a sensitive nature.

There is thus a widely recognized need for, and it would be highly advantageous to have, a method of executing a temporarily installed application on a general availability computer that leaves behind no residue of the execution.

SUMMARY OF THE INVENTION

According to the present invention there is provided a method of operating a computer, including the steps of: (a) storing at least one application in a non-volatile memory that is separate from the computer; (b) reversibly operationally connecting the separate non-volatile memory to the computer; (c) executing one of the at least one application, by the computer, the executing of the one application causing at least one change to a non-volatile memory of the computer, the change persisting after the executing of the one application terminates; and (d) undoing the at least one change, subsequent to the executing of the one application; wherein, if the executing of the one application terminates normally, the undoing is effected consequent to the terminating of the executing of the one application, and if the executing of the one application terminates abnormally, the method further comprises the steps of: (e) subsequent to the disconnecting, booting the computer, the undoing being initiated by the booting.

According to the present invention there is provided a computer-readable storage medium having computer-readable code embodied on the computer-readable-storage medium, the computer-readable code including: (a) an application; (b) a launcher for executing the application on a computer when the computer-readable storage medium is reversibly operationally connected to the computer, the executing of the one application causing at least one change to a non-volatile memory of the computer; and (c) program code for undoing the at least one change, subsequent to the executing.

According to the present invention there is provided a method of operating a computer, including the steps of: (a) storing at least one application in a non-volatile memory that is separate from the computer; (b) reversibly operationally connecting the separate non-volatile memory to the computer; (c) executing one of the at least one application, by the computer, the executing of the one application causing at least one change to a non-volatile memory of the computer, the change persisting after the executing terminates; (d) recording information related to the at least one change; and (e) undoing the at least one change, subsequent to the executing of the one application, the undoing being based at least in part on the information.

The present invention is a method of operating a computer and an associated computer-readable storage medium.

According to the two basic methods of the present invention, at least one application is stored in a non-volatile memory that is separate from the computer. That separate non-volatile memory then is reversibly operationally connected to the computer and one of the application(s) is executed by the computer, thereby causing one or more changes, to a non-volatile memory of the computer, that persist even after the termination of the execution of the application. This/these change(s) now are undone.

According to the first basic method of the present invention, if the execution of the application terminated "normally", i.e., with the computer still in a condition that enables the computer to continue to function without user intervention, then the undoing of the change(s) to the computer's non-volatile memory is effected as a consequence of the termination of the execution of the application (for example, by branching, upon termination of the execution of the application, to the first instruction of a routine that effects the undoing). The scope of the present invention thus excludes, for example, a user of the computer manually erasing the computer's non-volatile memory after the execution of the application has terminated. If the execution of the application terminated "abnormally", i.e., with the computer in a condition that requires user intervention to enable the computer to continue to function, for example in case of a power interruption or a system crash that necessitates a reboot, then the computer is booted (either a hard boot or a soft boot, depending on the nature of the abnormal termination) in a manner that initiates the undoing of the change(s) that were made to the computer's non-volatile memory by the application prior to the abnormal termination.

According to the second basic method of the present invention, while or before the application executes, information related to the change(s) to the computer's non-volatile memory are recorded. The undoing of the change(s) then is based at least in part on this information. At least a portion of the information is recorded in the separate non-volatile memory. Alternatively or additionally, at least a portion of the information is recorded in a volatile memory of the computer. Preferably, information that is recorded before the application executes includes a list of the change(s) that the application is expected to make in the computer's non-volatile memory and/or a copy of at least a portion of the computer's non-volatile memory.

The distinguishing feature (different kinds of "undoing", depending on whether the application terminates normally or abnormally) of the first basic method is a preferred additional feature of the second basic method. The distinguishing feature (recording information related to the change(s)) of the second basic method is a preferred additional feature of the first basic method.

The separate non-volatile memory may be a read-only memory, or a programmable memory (i.e., not a lead-only memory) such as a flash memory, or may include both a read-only portion and a programmable portion. For example, read-only memory is used as all or part of the separate non-volatile memory to store portions of the application that never need to be modified. In addition to flash memory, other examples of suitable non-volatile memories include non-volatile static RAM, bubble memory and compact hard disks.

Preferably, the execution of the application is consequent to the computer detecting that the separate non-volatile memory has been reversibly operationally connected to the computer, for example when a user of the computer effects that connection while the computer is running or when the computer boots while the separate non-volatile memory is connected to the computer. Alternatively, the execution of the application is consequent to an interaction of a user of the computer with the computer other than an interaction (such as connecting the separate non-volatile memory to the computer or turning on the computer while the separate non-volatile memory is connected to the computer) that makes the computer aware that the separate non-volatile memory is connected to the computer.

Preferably, at least one launcher also is stored in the separate non-volatile memory. A "launcher" is a program that the computer uses to manage the execution of one or more applications. "Managing" the execution of an application means invoking the execution of the application while recording information related to the change(s) that the execution of the application makes to the computer's non-volatile memory. If a single launcher is stored in the separate non-volatile memory, then either a single application or a plurality of applications, all of which are managed by the single launcher, are stored in the separate non-volatile memory. In the latter case, optionally, the launcher presents the applications interactively to a user of the computer, and the user selects which application to execute. Alternatively, a plurality of launchers and a corresponding plurality of applications are stored in the separate non-volatile memory, with each launcher managing one or more corresponding applications.

Optionally, the separate non-volatile memory is partitioned into a first portion where the application(s) is/are stored and a second portion from which the application(s) is/are blocked. "Blocking" the application(s) from the second portion of the separate non-volatile memory means that the application(s) and any data generated autonomously by the application(s) (as opposed to data generated by the application(s) under user control) may not be stored in that portion of the separate non-volatile memory. Instead, the second portion of the memory is available for general use by a user of the computer. Most preferably, the partitioning is done dynamically: space is reallocated by the computer between the two portions of the separate non-volatile memory on a space-required basis.

Preferably, prior to executing the application, a cleanup service is installed in the computer. The purpose of the cleanup service is to perform the undoing, of the change(s) made by the application to the computer's non-volatile memory, that is performed when the computer boots subsequent to an abnormal termination of the application. Optionally, the cleanup service also is used to undo the change(s) made by the application to the computer's non-volatile memory even if the application terminated normally. Most preferably, after the cleanup service has undone the change(s), the cleanup service is removed from the computer, either only if the cleanup service has undone the change(s) following an abnormal termination of the execution and a reboot of the computer, or even if the cleanup service has undone the change(s) following a normal termination of the execution of the application.

A computer-readable storage medium of the present invention has embodied thereon computer-readable code that includes an application, a launcher for executing the application on a computer when the computer-readable storage medium is reversibly operationally connected to the computer, such that the execution of the application causes one or more changes to a non-volatile memory of the computer, and program code for undoing those changes subsequent to the execution of the application.

The computer-readable storage medium may be a read-only medium or a programmable medium.

The computer-readable code may include a single launcher or a plurality of launchers. If the computer-readable code includes a single launcher, then the computer-readable code may include either a single application or a plurality of applications. If the computer-readable code includes a plurality of launchers, then preferably the computer-readable code also includes a corresponding plurality of applications, with each launcher for executing a respective application.

Preferably, the launcher also records information related to the change(s) to the computer's non-volatile memory caused by the execution of the application. The undoing of the change(s) is based at least in part on that information.

Preferably, the computer-readable code also includes a list of one or more changes that the executing of the application is expected to make to the computer's non-volatile memory. The undoing of the change(s) actually made by the executing of the application is based at least in part on that list.

The program code for undoing the change(s) may be included in the launcher or may be a cleanup service separate from the launcher.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of executing an application on a host computer without permanently installing the application on the computer and without subsequently leaving behind any consequences of the execution. Specifically, the present invention can be used by anyone to execute applications on a publicly shared computer.

The principles and operation of shared computer usage according to the present invention may be better understood with reference to the drawings and the accompanying description.

Figure 1:
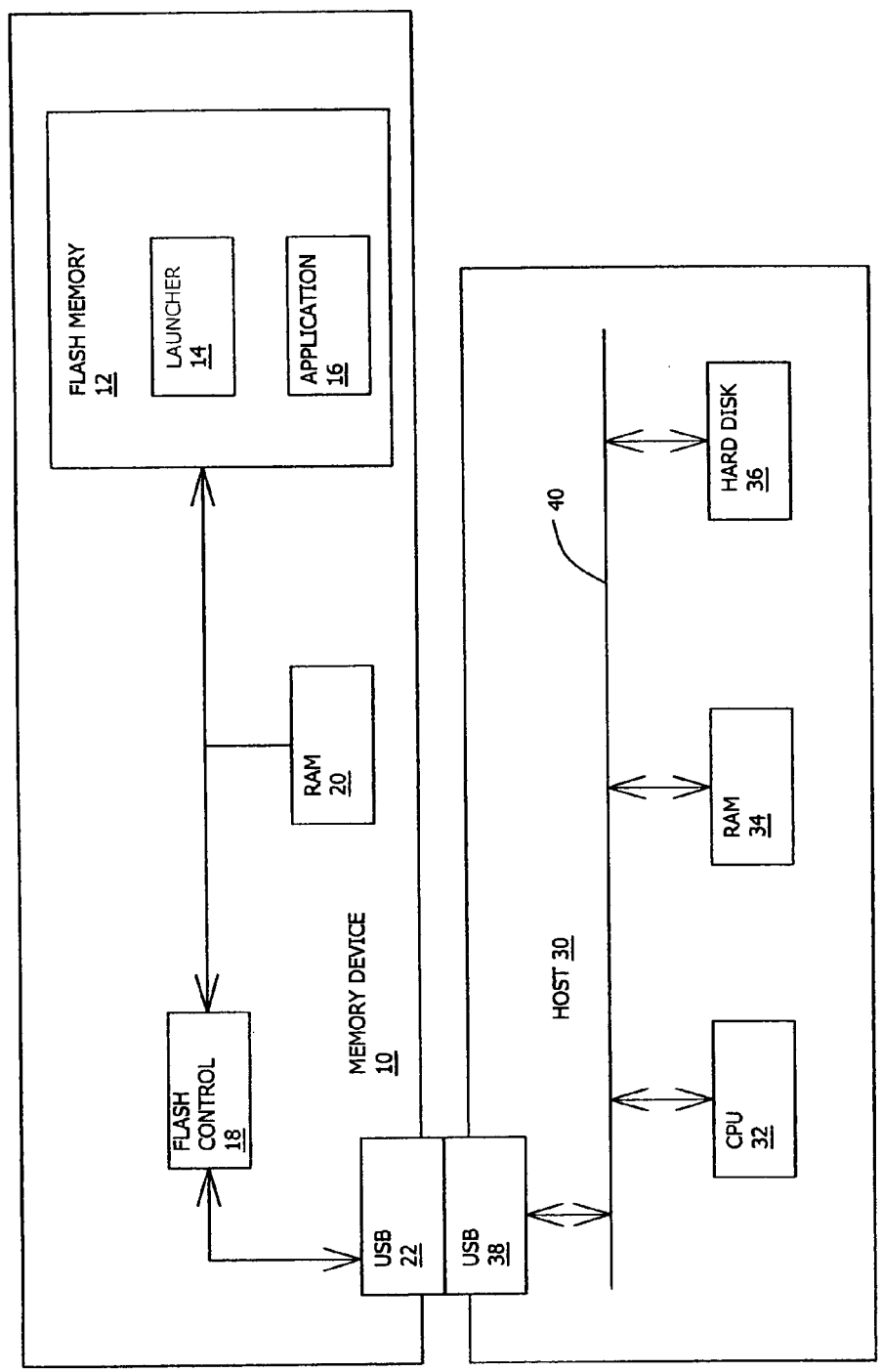
FIG. 1 is a partial high-level block diagram of a non-volatile memory device of the present invention reversibly operationally connected to a host computer.

Referring now to the drawings, FIG. 1 is a partial high-level block diagram of a non-volatile memory device 10 of the present invention operationally coupled to a host computer 30.

Memory device 10 is structurally substantially identical to the flash memory devices taught in U.S. Pat. No. 5,404,485, to Ban, and in U.S. Pat. No. 6,148,354, to Ban et al., both of which patents are incorporated by reference for all purposes as if fully set forth herein. Indeed, the block diagram of memory device 10 in FIG. 1 is patterned after FIG. 1 of U.S. Pat. No. 5,404,485. Memory device 10 includes a flash memory 12 that is managed by a flash controller 18 as taught in U.S. Pat. No. 5,404,485 with the help of a random access memory (RAM) 20. Two programs are stored in flash memory 12: a launcher 14 and an application 16. Memory device 10 also includes a universal serial bus (USB) interface 22 for communicating with other devices according to the USB protocol as taught in U.S. Pat. No. 6,148,354. One preferred embodiment of memory device 10 is the DiskOnKey™ flash disk, available from M-Systems Flash Disk Pioneers, Ltd. of Kfar Saba, Israel.

Host computer 30 includes a general purpose central processing unit (CPU) 32, a RAM 34, a non-volatile programmable memory (specifically, a hard disk) 36 and a USB interface 38, all communicating with each other via a bus 40. Host computer includes other components, such as input devices (keyboard, mouse, etc.) and output devices (display screen, printer, etc.) that, for illustrational simplicity, are not shown in FIG. 1. Memory device 10 is shown in FIG. 1 as reversibly operationally coupled to host computer 30 by the mutual physical contact of USB interfaces 22 and 38. For example, if memory device 10 is a DiskOnKey™, then memory device 10 is reversibly operationally coupled to host computer 30 by plugging memory device 10 into a USB port of host computer 30 and is disconnected from host computer 30 by unplugging memory device 10 from the USB port of host computer 30.

Figure 2:
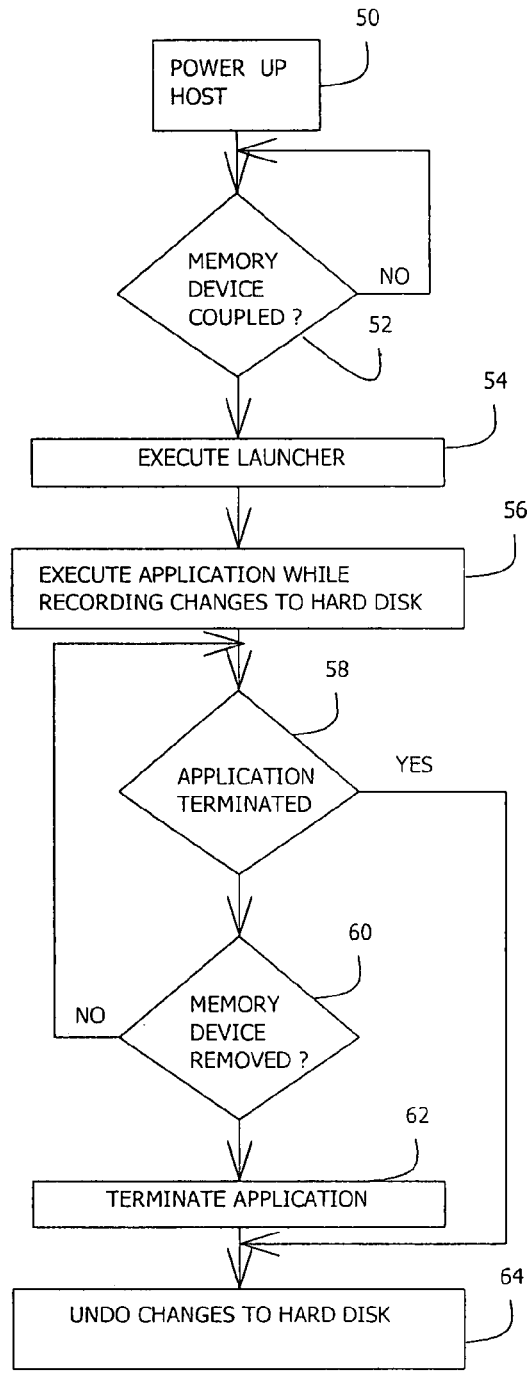
FIG. 2 is a flow chart of the execution of an application in a basic embodiment of the present invention.

FIG. 2 is a flow chart of the execution of application 16 by host computer 30 according to the present invention.

In block 50, host computer 30 is powered up. At this time, memory device 10 may or may not be operationally connected to host computer 30 via USB interfaces 22 and 38.

In block 52, host computer 30 determines whether memory device 10 is operationally connected to host computer 30. If memory device 10 is not operationally connected to host computer 30, then host computer 30 waits until memory device 10 is operationally connected to host computer 30.

When host computer 30 determines that memory device 10 is operationally connected to host computer 30, then host computer 30 proceeds to block 54 in which host computer 30 copies launcher 14 to RAM 34 and executes launcher 14 from RAM 34. The function of launcher 14 is to implement blocks 56 through 64.

In block 56, launcher 14 initiates the execution of application 16 by host computer 30. As in the case of launcher 14, host computer 30 typically copies application 16 to RAM 34 and executes application 16 from RAM 34. Alternatively, host computer 30 executes application 16 directly from flash memory 12. Meanwhile, launcher 14 monitors the changes that are made to the data stored in hard disk 36 while application 16 is executed, for example by monitoring traffic on bus 40, and records information related to these changes in RAM 34 or in flash memory 12. These changes include both data written to hard disk 36 by application 16 and data written to hard disk 36 by concurrently running programs, for example by the operating system of host computer 30, while application 16 is executed. The purpose of this information is to enable launcher 14 to undo the changes in block 64. To this end, sufficient information is recorded to enable launcher 14 to undo the changes. For example, if a registry setting is changes while application 16 is executed, launcher 14 records the initial value and its address in hard disk 36.

In the case of other changes that need not be restored, for example, files written to hard disk 36 by application 16, launcher 14 records only the address of the change in hard disk 36.

During the execution of application 16, launcher 14 repeatedly tests two exit conditions. If the execution of application 16 terminates (block 58), then control branches to block 64. If memory device 10 is disconnected from host computer 30 (block 60), then the execution of application 16 is terminated in block 62. Finally, after the execution of application 16 has terminated, in block 64 launcher 14 uses the information that has been recorded about the changes to hard disk 36 in block 56 to undo the changes to hard disk 36. Changes that need to be reversed, for example restoration of registry settings to their original values, are reversed. Other changes are merely undone, for example by overwriting files created by application 16 in hard disk 36 with zeroes or with random data. Note that no measures need to be taken to undo changes made to RAM 34 during the execution of application 16 because RAM 34 is erased automatically when host computer 30 finishes undoing the changes to hard disk 36, powers down or reboots.

Optionally, if it is known in advance that certain changes to hard disk 36 will be made during the execution of application 16, a list of these changes is stored in flash memory 12. In block 64, launcher 14 refers to this list, in addition to the recorded changes, to undo the changes made to hard disk 36 during the execution of application 16. The provision of the list of known changes reduces the amount of processing that launcher 14 must do to undo the changes to hard disk 36, and also provides launcher 14 with information, for example information about changes to hard disk 36 that are expected to occur before block 54 or after block 62, that otherwise would not be available to launcher 14. Note that because changes to hard disk 36 that occur before block 54 or after block 62 are not changes that are made during the execution of application 16, undoing these changes is only optional. In some embodiments of the present invention, launcher 14 does not record changes to hard disk 36 in block 56, but merely undoes the changes that are expected in advance and that are recorded in the list of expected changes that is provided in flash memory 12.

Optionally, as part of block 54, launcher 14 copies part or all of hard disk 36 to flash memory 12 or to a different memory (not shown) that is temporarily connected to host computer 30. In block 64, launcher 14 compares that full or partial copy of hard disk 36 to hard disk 36 in order to determine how to undo the changes to hard disk 36 that were effected during the execution of application 16. Alternatively, in block 54, launcher 14 copies the part of hard disk 36, that will be modified by the execution of application 16, to another part of hard disk 36. Later, in block 64, launcher 14 compares the copy of the modified part of hard disk 36 to the modified part of hard disk 36 to determine how to undo the changes to hard disk 36 that were effected during the execution of application 16. Then launcher 14 undoes the changes to the modified part of hard disk 36 and erases the copy of the modified part of hard disk 36.

In the embodiment of the present invention that is illustrated in FIG. 2, launcher 14 and application 16 are invoked automatically when host computer 30 determines that memory device 10 is operationally connected to host computer 30. Alternatively, launcher 14 is invoked interactively by a user of host computer 30. For example, if the operating system of host computer 30 is an operating system such as Microsoft Windows™ that provides a graphical user interface (GUI), when memory device 10 is operationally connected the host computer 30 the operating system displays to the user a window that includes an icon that represents launcher 14. The user invokes launcher 14 by selecting the icon using a standard GUI method, for example by pointing to and clicking on the icon using a mouse. Optionally, this interactive mechanism is used by the user even in the embodiment illustrated in FIG. 2, to re-start application 16 after block 64 without disconnecting and reconnecting memory device 10.

Figure 3:
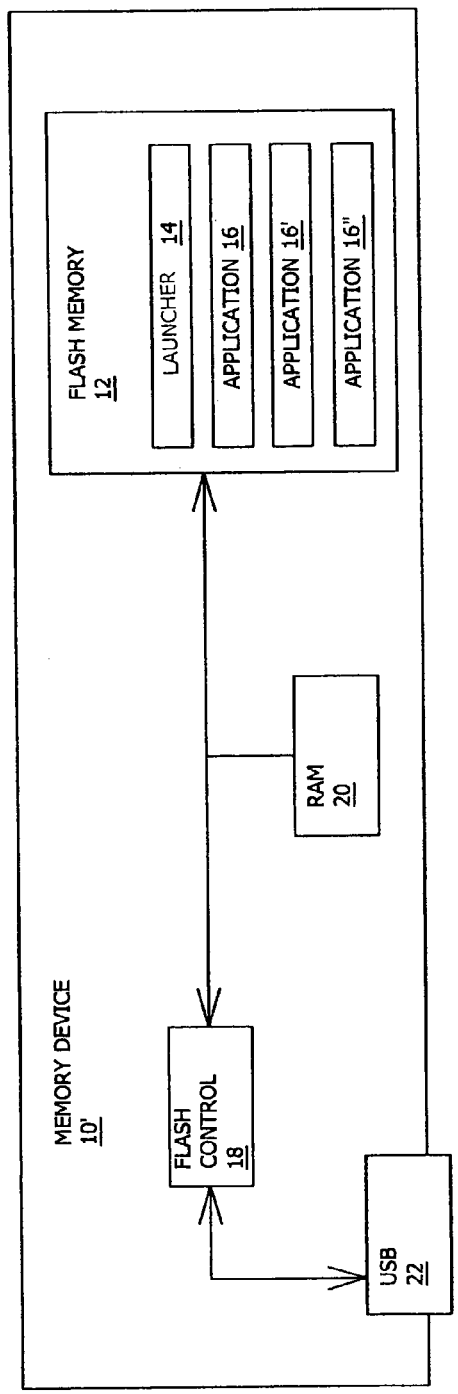
FIG. 3-5 are high-level block diagrams of other non-volatile memory devices of the present invention.

FIG. 3 is a high-level block diagram of another memory device 10' of the present invention. Memory device 10' is identical to memory device 10 of FIG. 1, except for the presence of several (three are illustrated) applications 16, 16' and 16" in flash memory 12. Launcher 14 manages the successive execution of all three applications 16, 16' and 16". First, launcher 14 invokes application 16. After launcher 14 has cleaned up after application 16, launcher 14 invokes application 16'. After launcher 14 has cleaned up after application 16', launcher 14 invokes application 16". Finally, launcher 14 cleans up after application 16". Alternatively, launcher 14 is operative to enable a user of host computer 30 to select, for example via a GUI, which one of applications 16, 16' and 16" is to be invoked.

As another alternative, launcher 14 manages the simultaneous execution of applications 16, 16' and 16". Launcher 14 invokes all three applications 16, 16' and 16" substantially concurrently, and cleans up after them after they finish executing.

Figure 4:
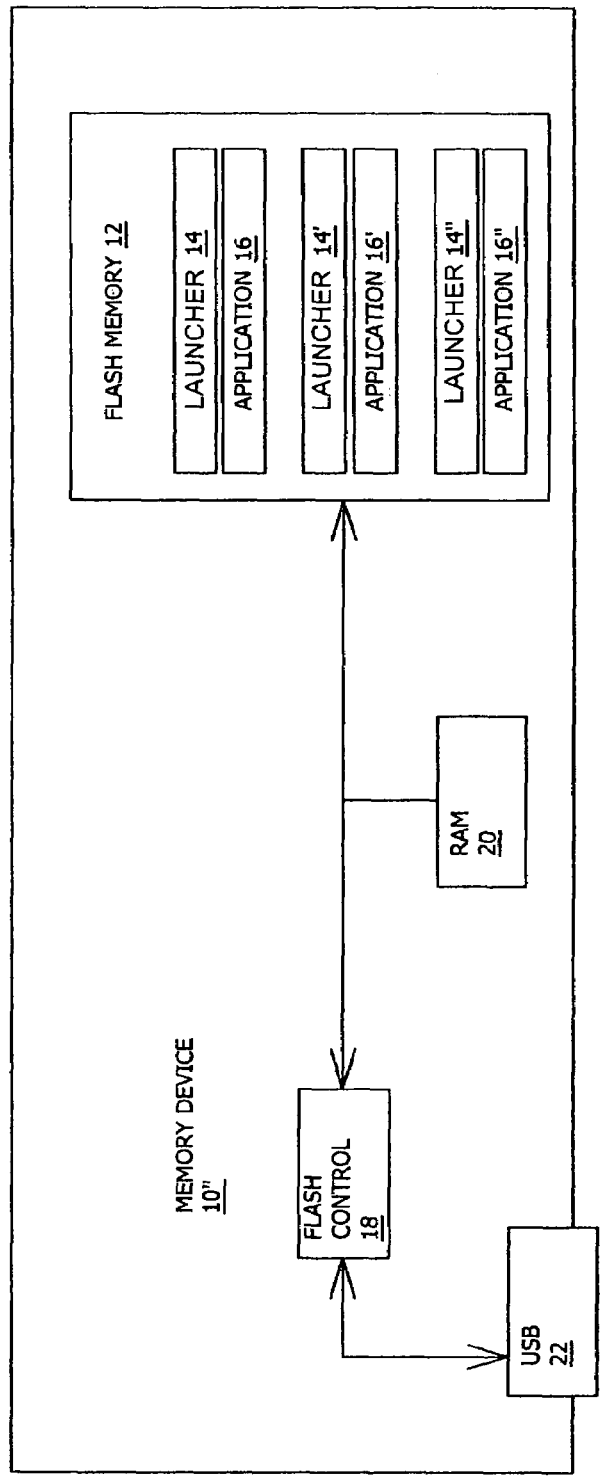

FIG. 4 is a high-level block diagram of a third memory device 10" of the present invention. Memory device 10' is identical to memory device 10 of FIG. 1 except for the presence of several (three are illustrated) launchers 14, 14' and 14" along with corresponding applications 16, 16' and 16". Launcher 14 manages the execution of application 16. Launcher 14' manages the execution of application 16'. Launcher 16" manages the execution of application 16". In one embodiment of the present invention, launcher 14 and application 16 are invoked automatically when host computer 30 determines that memory device 10 is operationally connected to host computer 30. After launcher 14 has finished cleaning up after application 16, launcher 14 invokes launcher 14' and application 16'. After launcher 14' has finished cleaning up after application 16', launcher 14' invokes launcher 14" and application 16". Alternatively, launchers 14, 14' and 14" are invoked interactively by a user of host computer 30, as described above for memory device 10'.

Figure 5:
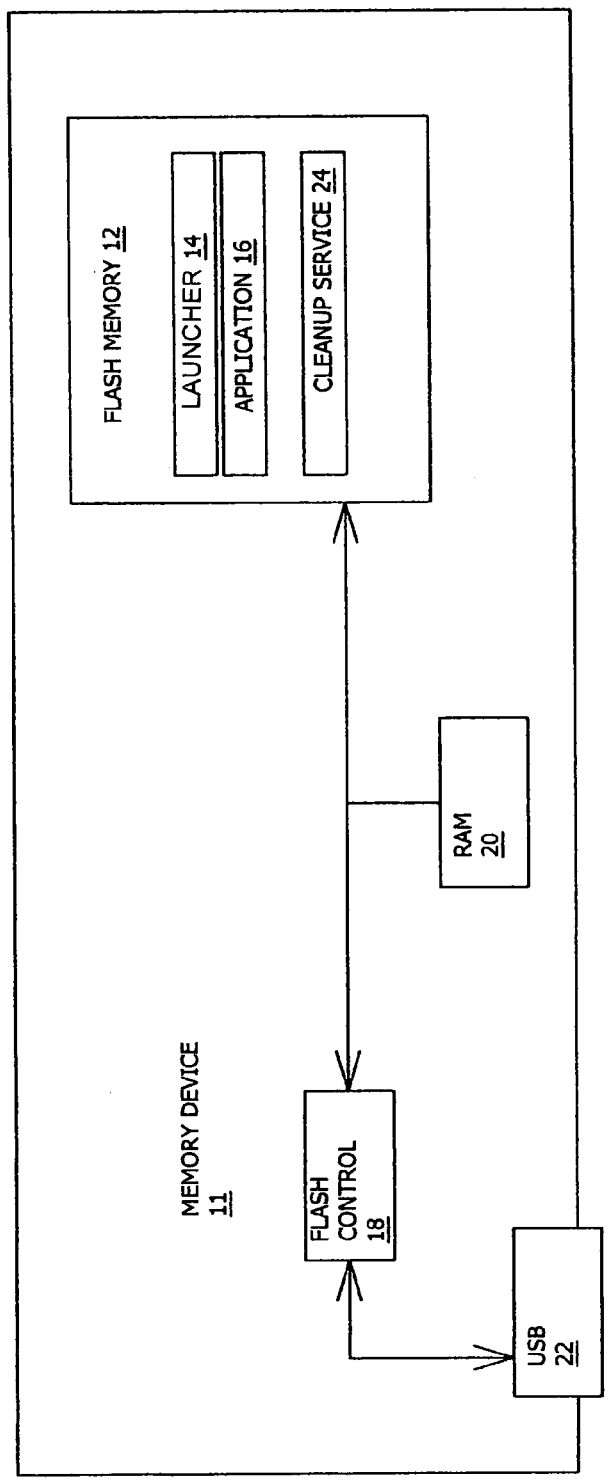
Figure 6:
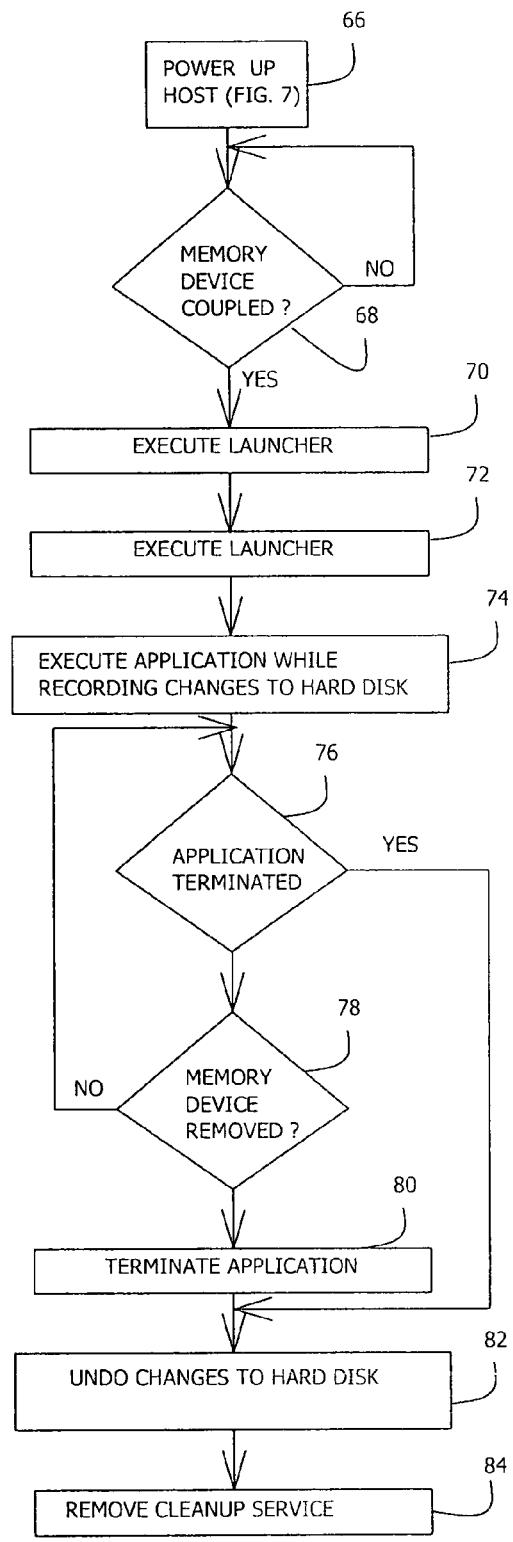
FIGS. 6 and 7 are flowcharts of the execution of an application in an embodiment of the present invention that is robust relative to abnormal termination of the execution.
Figure 7:
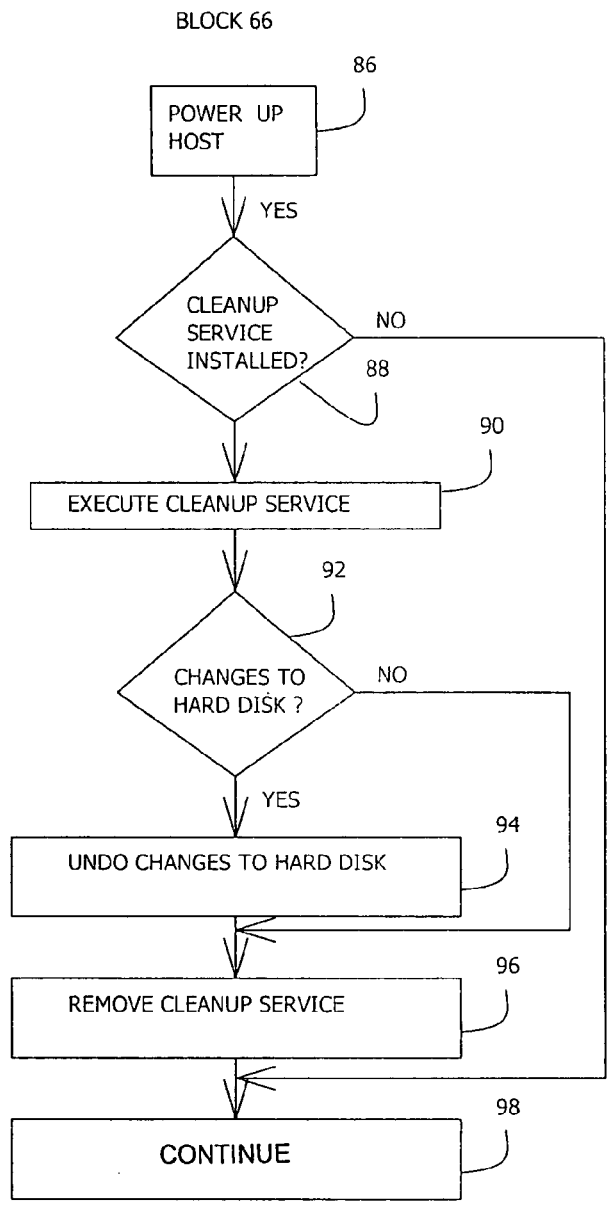

FIG. 5 is a high-level block diagram of a fourth memory device 11 of the present invention. Memory device 11 is identical to memory device 10 of FIG. 1 except for the presence in flash memory 12, in addition to launcher 14 and application 16, of a cleanup service 24. Cleanup service 24 duplicates the cleanup functionality of launcher 14 and is configured so that when cleanup service 24 is installed in host computer 30, the operating system of host computer 30 executes cleanup service 24 as part of the boot process of host computer 30. The purpose of cleanup service 24 is to clean up after application 16 if the execution of application 16 or the subsequent cleanup by launcher 14 is interrupted by a hardware fault such as a loss of power. FIGS. 6 and 7 are flowcharts of how this is accomplished.

FIG. 6 is broadly similar to FIG. 2. In block 66, host computer 30 is powered up. In addition, housekeeping functions related to cleanup service 24 are performed, as illustrated in FIG. 7. In block 68, host computer 30 determines whether memory device 11 is operationally connected to host computer 30. If memory device 11 is not operationally connected to host computer 30, then host computer 30 waits until memory device 11 is operationally connected to host computer 30.

When host computer 30 determines that memory device 11 is operationally connected to host computer 30, then host computer 30 proceeds to block 70 in which host computer 30 executes launcher 14. In this embodiment of the present invention, the function of launcher 14 is to implement blocks 72 through 84.

In block 72, launcher 14 installs cleanup service 24 in host computer 30. In block 74, launcher 14 initiates the execution of application 16. Meanwhile, launcher 14 monitors the changes that are made to the data stored in hard disk 36 during the execution of application 16, for example by monitoring traffic on bus 40, and records information related to these changes.

During the execution of application 16, launcher 14 repeatedly tests two exit conditions. If the execution of application 16 terminates (block 76) then control branches to block 82. If memory device 11 is disconnected from host computer 30 (block 78), then the execution of application 16 is terminated in block 80. After the execution of application 16 has terminated, in block 82 launcher 14 uses the information that has been recorded about the changes to hard disk 36 in block 74 to undo the changes to hard disk 36. Finally, launcher 14 removes cleanup service 24 from host computer 30.

Turning now to FIG. 7, block 86 of FIG. 7 is substantially identical to block 50 of FIG. 2: normal powerup of host computer 30 as host computer 30 would be powered up in the absence of cleanup service 24. If cleanup service 24 is installed in host computer 30 (block 88), then in block 90 the operating system of host computer 30 initiates the execution of cleanup service 24. In block 92, cleanup service 24 checks to see if hard disk 36 includes any changes made by the interrupted execution of application 16. Note that in order for cleanup service 24 to do this, the information about the changes to hard disk 36 must have been stored in hard disk 36 and not in flash memory 12 (in case host computer 30 is powered up without being operationally connected to memory device 10) or RAM 34. If any such changes were made, they are undone in block 94. Finally, cleanup service 24 is removed from host computer 30 in block 96, and host computer proceeds (block 98) to test, in block 68 of FIG. 6, for the presence of memory device 11.

As noted above, the purpose of cleanup service 24 is to remove from hard disk 36 the changes made by application 16 to hard disk 36 under circumstances that prevent host computer 30 from completing block 64 of FIG. 2. This is why, in FIG. 6, cleanup service 24 is removed from host computer 30 in block 84 after the completion of block 82. Alternatively, to save execution time, block 84 is skipped: cleanup service 24 will be removed from host computer 30 in block 96 of FIG. 7 anyway the next time host computer 30 is powered up.

Alternatively, launcher 14 lacks code of its own for undoing, in block 82 of FIG. 6, the changes made to hard disk 36 during the execution of application 16. Instead, launcher 14 executes cleanup service 24 for this purpose.

Preferably, cleanup service 24 is installed in host computer 30, in block 72 of FIG. 6, in a manner that ensures that no indication is left behind in host computer 30 that cleanup service 24 ever was installed in host computer 30. For example, if the operating system of host computer 30 is a Microsoft Windows™ operating system, then cleanup service 24 is installed using the Microsoft Windows™ "run-once" service setting.

While the invention has been described with respect to a limited number of embodiments, it will be appreciated that many variations, modifications and other applications of the invention may be made.

What is claimed is:

1. A method of operating a computer, comprising the steps of:
   (a) storing at least one application in a non-volatile memory that is separate from the computer;
   (b) reversibly operationally connecting said separate non-volatile memory to the computer;
   (c) executing one of said at least one application, by the computer, said executing of said one application causing at least one change to a non-volatile memory of the computer, said change persisting after said executing of said one application terminates; and
   (d) undoing said at least one change, subsequent to said executing; wherein, if said executing of said one application terminates normally, said undoing is effected consequent to said terminating of said executing of said one application, and if said executing of said one application terminates abnormally, the method further comprises the steps of:
   (e) subsequent to said disconnecting, booting the computer, said undoing being initiated by said booting.

2. The method of claim 1, further comprising the step of:
   (f) recording information related to said at least one change, said undoing being based at least in part on said information.

3. The method of claim 2, wherein at least a portion of said information is recorded in said separate non-volatile memory.

4. The method of claim 2, wherein at least a portion of said information is recorded in a volatile memory of the computer.

5. The method of claim 2, wherein at least a portion of said recording is effected during said executing of said one application.

6. The method of claim 2, wherein at least a portion of said recording is effected prior to said executing of said one application.

7. The method of claim 6, wherein said information includes a list of at least one said change that said executing of said one application is expected to effect.

8. The method of claim 6, wherein said information includes a copy of at least a portion of said non-volatile memory of the computer.

9. The method of claim 1, wherein said separate non-volatile memory is a read-only memory.

10. The method of claim 1, wherein said separate non-volatile memory is a programmable memory.

11. The method of claim 10, wherein said separate non-volatile memory is a flash memory.

12. The method of claim 1, wherein said separate non-volatile memory includes both a read-only portion and a programmable portion.

13. The method of claim 1, wherein said executing of said one application is consequent to the computer detecting said reversibly operationally connecting of said separate non-volatile memory to the computer.

14. The method of claim 1, wherein said executing of said one application is initiated by an interaction, of a user of the computer with the computer, other than causing the computer to detect said reversibly operationally connecting of said separate non-volatile memory to the computer.

15. The method of claim 1, further comprising the step of:
(f) storing, in said separate non-volatile memory, at least one launcher of said at least one application, execution of each said at least one application being managed by a respective said launcher.

16. The method of claim 15, wherein a single said launcher is stored in said separate non-volatile memory.

17. The method of claim 16, wherein a single said application is stored in said separate non-volatile memory.

18. The method of claim 16, wherein a plurality of said applications is stored in said separate non-volatile memory.

19. The method of claim 18, wherein said launcher is operative to present said plurality of applications interactively to a user of the computer, the method further comprising the step of:
(f) selecting, by said user, which one of said applications is to be executed.

20. The method of claim 15, wherein a plurality of said launchers and a like plurality of said applications are stored in said separate non-volatile memory.

21. The method of claim 1, further comprising the step of:
(f) partitioning said separate non-volatile memory into a first portion wherein said at least one application is stored and a second portion wherefrom said at least one application is blocked.

22. The method of claim 21, wherein said partitioning is done dynamically.

23. The method of claim 1, further comprising the step of:
(f) prior to said executing of said one application, installing in the computer a cleanup service for effecting said undoing when said booting is effected.

24. The method of claim 23, wherein said undoing also is effected by said cleanup service if said executing of said one application terminates normally.

25. The method of claim 24, further comprising the step of:
(g) removing said cleanup service, subsequent to said undoing.

26. The method of claim 25, wherein said removing is effected only if said undoing is initiated by said booting.

27. The method of claim 23, further comprising the step of:
(g) removing said cleanup service from the computer, subsequent to said booting.

* * * * *

UNITED STATES PATENT AND TRADEMARK OFFICE
CERTIFICATE OF CORRECTION

PATENT NO. : 7,296,144 B2  Page 1 of 1
APPLICATION NO. : 10/994384
DATED : November 13, 2007
INVENTOR(S) : Bryant-Rich et al.

It is certified that error appears in the above-identified patent and that said Letters Patent is hereby corrected as shown below:

Column 2 line 48:

"disconnecting" should be changed to --abnormal termination--.

Column 6 line 66:

"changes" should be changed to --changed--.

Column 10 line 25:

"disconnecting" should be changed to --abnormal termination--.

Signed and Sealed this

Seventeenth Day of June, 2008

JON W. DUDAS
*Director of the United States Patent and Trademark Office*